(12) United States Patent
Kortenoeven et al.

(10) Patent No.: US 8,018,617 B2
(45) Date of Patent: Sep. 13, 2011

(54) ERASING A STORED INFORMATION PATTERN ON A STORAGE MEDIUM

(75) Inventors: Johannes Kortenoeven, Panningen (NL); Jeroen J. Döpp, Reuver (NL); Jantinus Woering, Venlo (NL); Johannes E. Spijkerbosch, Tiel (NL); Bas H. Peeters, Reuver (NL)

(73) Assignee: OCE-Technologies B.V., Venlo (NL)

( * ) Notice: Subject to any disclaimer, the term of this patent is extended or adjusted under 35 U.S.C. 154(b) by 1483 days.

(21) Appl. No.: 11/014,980

(22) Filed: Dec. 20, 2004

(65) Prior Publication Data
US 2005/0154582 A1 Jul. 14, 2005

(30) Foreign Application Priority Data

Dec. 19, 2003 (EP) ..................................... 03078991

(51) Int. Cl.
*G06K 9/34* (2006.01)
(52) U.S. Cl. ...................... 358/1.16; 358/1.14; 358/1.13; 358/1.6; 713/193; 704/200; 360/60; 360/15; 711/103; 711/118; 711/166; 711/152
(58) Field of Classification Search .................. 358/1.15, 358/403, 1.13, 1.14, 1.6, 1.9, 1.16; 709/238, 709/224; 360/60, 15; 707/8, 201; 708/8; 713/193; 704/200; 711/163, 156, 158, 159, 711/166, 103, 118, 145, 152
See application file for complete search history.

(56) References Cited

U.S. PATENT DOCUMENTS

| 5,119,200 | A | * | 6/1992 | Van Den Hombergh et al. ............................ 348/563 |
| 5,251,318 | A | * | 10/1993 | Nitta et al. ..................... 711/152 |
| 5,442,763 | A | * | 8/1995 | Bartfai et al. ................. 711/145 |
| 5,897,658 | A | * | 4/1999 | Eskesen et al. ................ 711/152 |
| 5,974,232 | A | * | 10/1999 | Kamiya ......................... 709/238 |
| 6,006,005 | A | * | 12/1999 | Okitsu ............................ 386/46 |
| 6,108,235 | A | * | 8/2000 | Honma ..................... 365/185.04 |

(Continued)

FOREIGN PATENT DOCUMENTS

EP 0 606 139 A2 7/1994

(Continued)

OTHER PUBLICATIONS

P. Gutmann, "Secure Deletion of Data from Magnetic and Solid-State Memory", Sixth USENIX Security Symposium Proceedings, San José, CA USA, Jul. 22-25, 1996, pp. 77-90.

(Continued)

*Primary Examiner* — Chan S Park
*Assistant Examiner* — Ashish K Thomas
(74) *Attorney, Agent, or Firm* — Birch, Stewart, Kolasch & Birch, LLP

(57) ABSTRACT

A method is presented of erasing, in a document data processing device, a stored information pattern on a rewritable data carrier that is accessible by a data processing facility of the document data processing device. The document data processing device includes primary processes for processing document data, wherein data may be stored on the data carrier, and secondary processes for erasing stored data, through overwriting a selected storage area of the carrier by a shredding pattern. According to the method, the primary and secondary processes are run asynchronously, e.g., the secondary processes are run in background, in order not to hinder the primary processes. In a particular embodiment, an initial shredding run is made directly after a file is no longer used, and additional shredding runs are made in background.

16 Claims, 5 Drawing Sheets

U.S. PATENT DOCUMENTS

| | | | | |
|---|---|---|---|---|
| 6,125,054 | A * | 9/2000 | Yusa et al. | 365/185.04 |
| 6,360,220 | B1 * | 3/2002 | Forin | 707/8 |
| 6,598,135 | B1 * | 7/2003 | MacLeod | 711/163 |
| 6,643,758 | B2 * | 11/2003 | Furuyama et al. | 711/203 |
| 6,731,447 | B2 * | 5/2004 | Bunker et al. | 360/60 |
| 7,024,442 | B2 * | 4/2006 | Yamamoto et al. | 708/404 |
| 7,158,266 | B2 * | 1/2007 | Kameyama | 358/403 |
| 7,170,622 | B2 | 1/2007 | Nobuhara et al. | |
| 7,266,641 | B2 * | 9/2007 | Kamei et al. | 711/118 |
| 7,325,052 | B1 * | 1/2008 | Motoyama | 709/223 |
| 7,421,534 | B2 * | 9/2008 | Kurosawa | 711/103 |
| 7,469,327 | B2 * | 12/2008 | Kawamura et al. | 711/163 |
| 7,472,260 | B2 * | 12/2008 | Lien et al. | 712/225 |
| 2002/0181134 | A1 | 12/2002 | Bunker et al. | |
| 2004/0114265 | A1 * | 6/2004 | Talbert | 360/60 |
| 2004/0120004 | A1 * | 6/2004 | Okamoto et al. | 358/1.15 |
| 2004/0268025 | A1 * | 12/2004 | Matsubara et al. | 711/103 |
| 2006/0085614 | A1 * | 4/2006 | Sakai et al. | 711/163 |
| 2008/0028134 | A1 * | 1/2008 | Matsubara et al. | 711/103 |

FOREIGN PATENT DOCUMENTS

| | | |
|---|---|---|
| JP | 4-257916 A | 9/1992 |
| JP | 09-223061 | 8/1997 |
| JP | 9-223061 A | 8/1997 |
| JP | 2003-256283 A | 9/2003 |

OTHER PUBLICATIONS

Peter Gutmann, "Secure Deletion of Data from Magnetic and Solid-State Memory," Proceedings of the Sixth USENIX Security Symposium, San Jose, CA, 14 pages, (Jul. 22, 1996) XP-002190890.

Anonymous, "SecrDisk(TM) (Secure Disk) ReadMe.Txt file", Program Documentation, pp. 1-7, Apr. 2, 1999, XP-002268981.

* cited by examiner

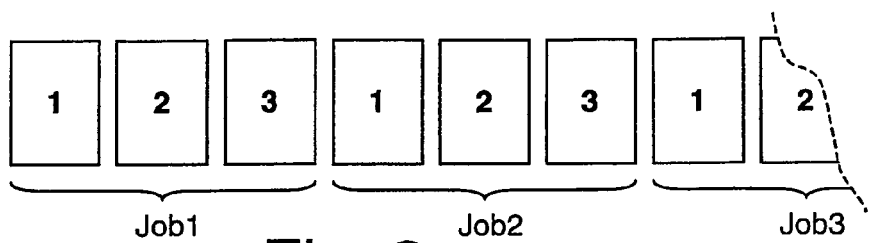
Fig. 2
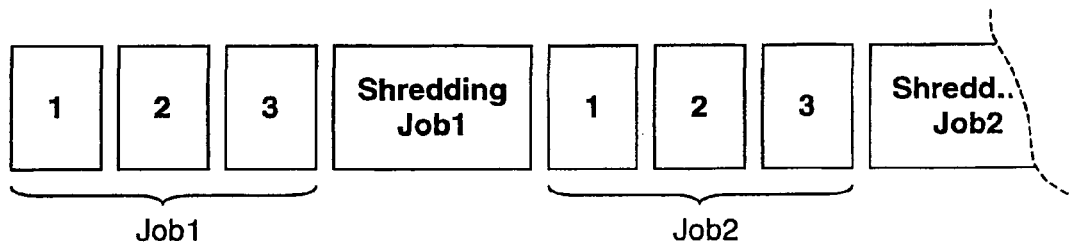
Fig. 3 (SYNCHRONOUS SHREDDING)
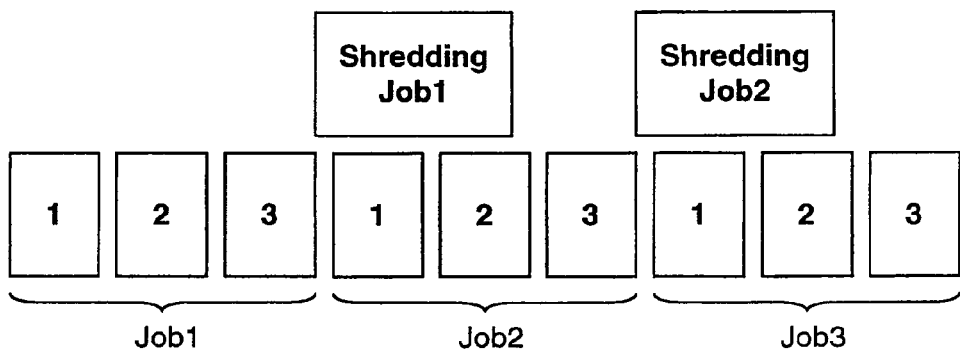
Fig. 4 (ASYNCHRONOUS SHREDDING)
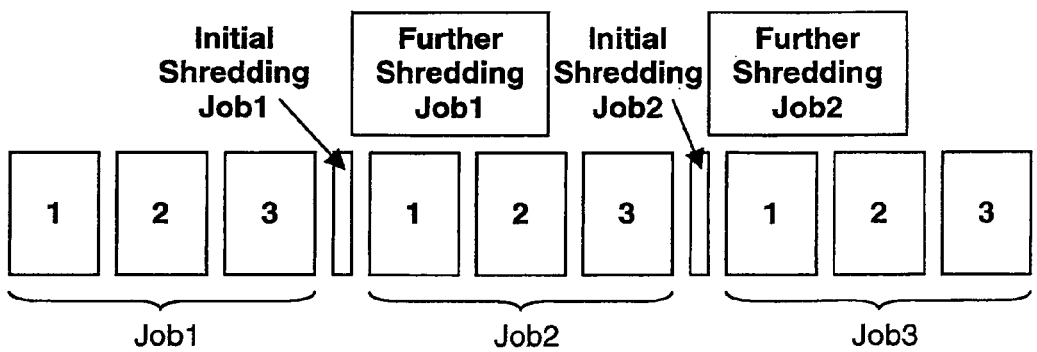
Fig. 5 (MIXED MODE SHREDDING)

| Overwrite data | |
|---|---|
| Pass No | Data written |
| 1 | Random |
| 2 | Random |
| 3 | Random |
| 4 | Random |
| 5 | 0x55 |
| 6 | 0xaa |
| 7 | 0x92 0x49 0x24 |
| 8 | 0x49 0x24 0x92 |
| 9 | 0x24 0x92 0x49 |
| 10 | 0x00 |
| 11 | 0x11 |
| 12 | 0x22 |
| 13 | 0x33 |
| 14 | 0x44 |
| 15 | 0x55 |
| 16 | 0x66 |
| 17 | 0x77 |
| 18 | 0x88 |
| 19 | 0x99 |
| 20 | 0xaa |
| 21 | 0xbb |
| 22 | 0xcc |
| 23 | 0xdd |
| 24 | 0xee |
| 25 | 0xff |
| 26 | 0x92 0x49 0x24 |
| 27 | 0x49 0x24 0x92 |
| 28 | 0x24 0x92 0x49 |
| 29 | 0x6d 0xb6 0xdb |
| 30 | 0xb6 0xdb 0x6d |
| 31 | 0xdb 0x6d 0xb6 |
| 32 | Random |
| 33 | Random |
| 34 | Random |
| 35 | Random |

Fig. 7

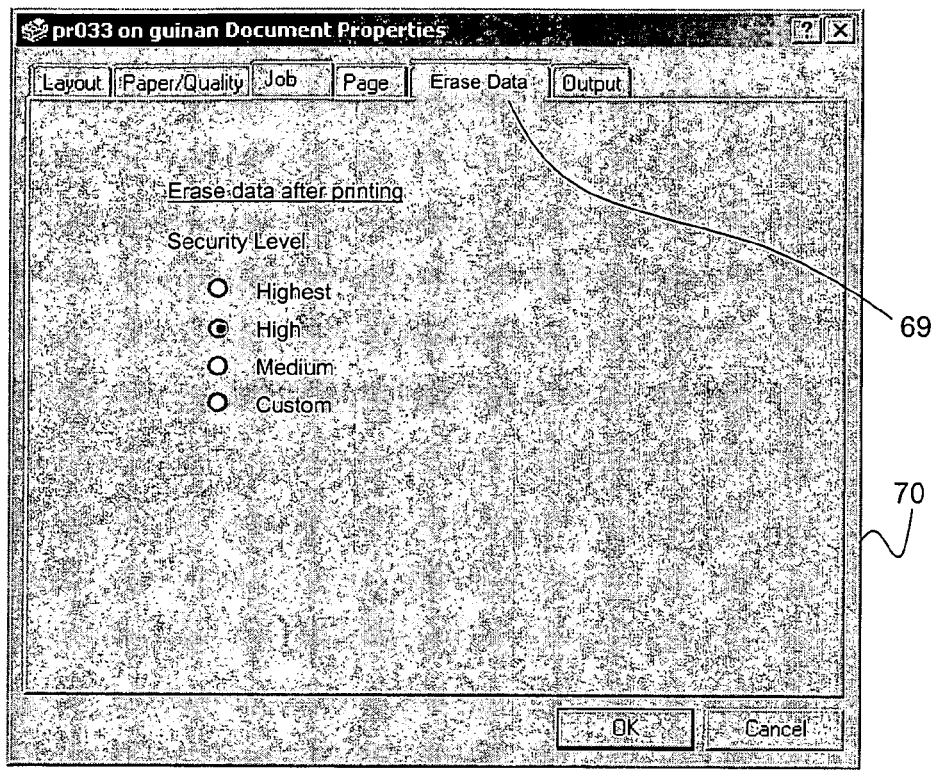
Fig. 8 a
Fig. 8 b
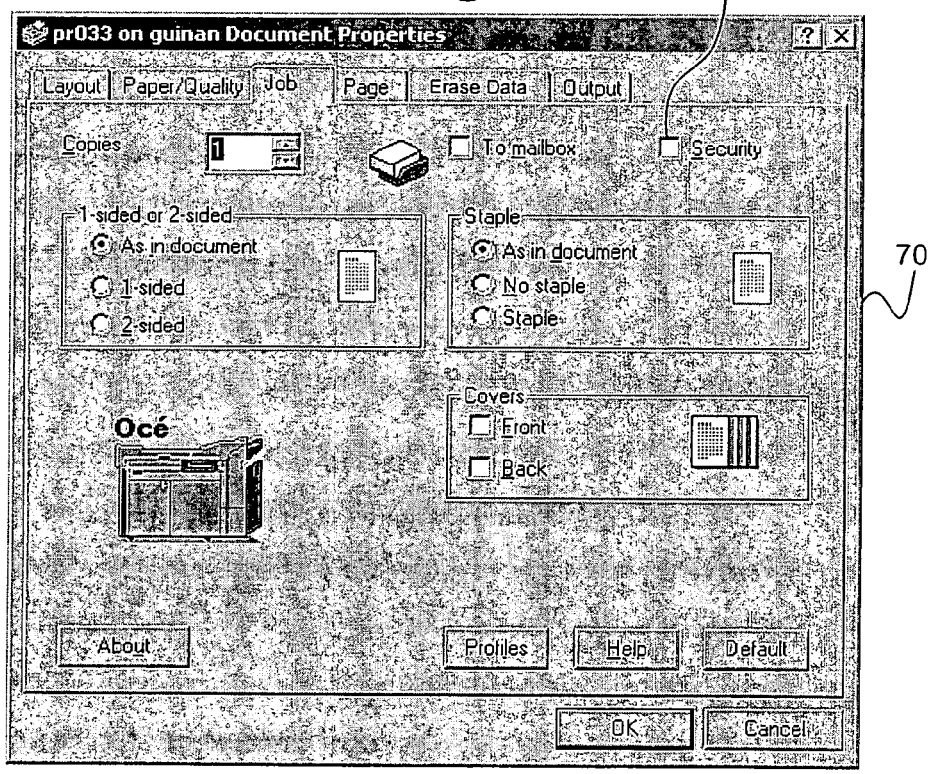

ERASING A STORED INFORMATION PATTERN ON A STORAGE MEDIUM

This application claims the priority benefit of Patent Application No. 03078991.1 filed on Dec. 19, 2003 in Europe, which is hereby incorporated by reference.

BACKGROUND OF THE INVENTION

1. Field of the Invention

The invention relates to a method of erasing, in a document data processing device, a stored information pattern on a rewritable data carrier that is accessible by a data processing facility of the document data processing device, the document data processing device having primary processes for processing document data that may be stored on the data carrier, and secondary processes for erasing stored data, through overwriting a selected storage area of the data carrier by a shredding pattern.

2. Discussion of the Background Art

Magnetic hard disks and other more or less similar storage facilities are increasingly vulnerable to reading of confidential data that is stored thereon. A first type of attack may occur through a hacker "entering" the facility via a data network. Such interference may be countered by relatively simple operations, such as encrypting the data before storing them on the internal hard disc, deleting the entry of the particular data file in the file administration of the carrier, or preferably overwriting the data.

A more serious type of attack may occur after physical removal of such a disk from a Personal Computer, a Digital Access Controller associated to a printing facility, or others. Deleting the file administration of the carrier will then be to no avail.

Reformatting the carrier or over-writing the data by a so-called shredding pattern provides improved security, but there are techniques for detecting bit patterens that have been over-written. A single "data shredding" run is therefore insufficient when deletion of certain data is really important.

Overwriting data with a plurality of shredding runs involving multiple different bit patterns, further to be called: shredding patterns, is generally considered as an effective policy, wherein the construction of the shredding patterns should be appropriate to the intended degree of security.

The data carrier can be based on various different writing/storing technologies, such as magnetic, magneto-optical, optical such as in a rewritable CD, and others. Usually, the geometrical storage organization is based on a kind of track, that may be a cylinder, a spiral, a straight line, or others. The storage physics is based on some kind of remanence property of the storage substrate.

In particular, United States Patent Application Publication No. 2002/0181134 A1 to Bunker et al. discloses the application of user-selectable shredding patterns. The present inventors have recognized that this technology may offer enough protection against infringers, but that the long time required by the overall shredding will keep the data processing proper, e.g. printing, stalled for an often highly needed time interval and may therefore severely degrade system performance.

Furthermore, an overall discussion of shredding operations and other related items is given in P. Gutmann, "Secure Deletion of Data from Magnetic and Solid-State Memory", Sixth USENIX Security Symposium Proceedings, San José, Calif. USA, Jul. 22-25, 1996, pp. 77-90.

SUMMARY OF THE INVENTION

In consequence, amongst other things, it is an object of the present invention to share the data storage facility between the data processing proper on the one hand and the shredding operation on the other by effecting the latter operation at least partially in the background of the former operation.

It is another object of the present invention to provide a method and device for processing document data, which overcome the limitations and problems associated with the background art.

Now therefore, according to one of its aspects, the invention is directed to running primary and secondary processes asynchronously, i.e. starting a primary process irrespective of the completion of any pending secondary processes.

The invention also relates to an apparatus being arranged for implementing the method of the invention.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

These and further features, aspects and advantages of the invention will be discussed more in detail hereinafter with reference to the disclosure of preferred embodiments of the invention, and in particular with reference to the appended Figures that illustrate:

FIG. 2 is an operation diagram without shredding being applied;

FIG. 3 is an operation diagram with synchronous shredding;

FIG. 4 is an operation diagram with asynchronous shredding;

FIG. 5 is an operation diagram with mixed mode shredding;

FIG. 7 is a Table of shredding patterns;

FIGS. 8A and 8B are user interface windows for controlling data erasure according to the invention.

DETAILED DESCRIPTION OF PREFERRED EMBODIMENTS

In the following, the term "shredding" will be used for erasure of stored data patterns on a hard disc or other rewritable storage media.

Figure 1:
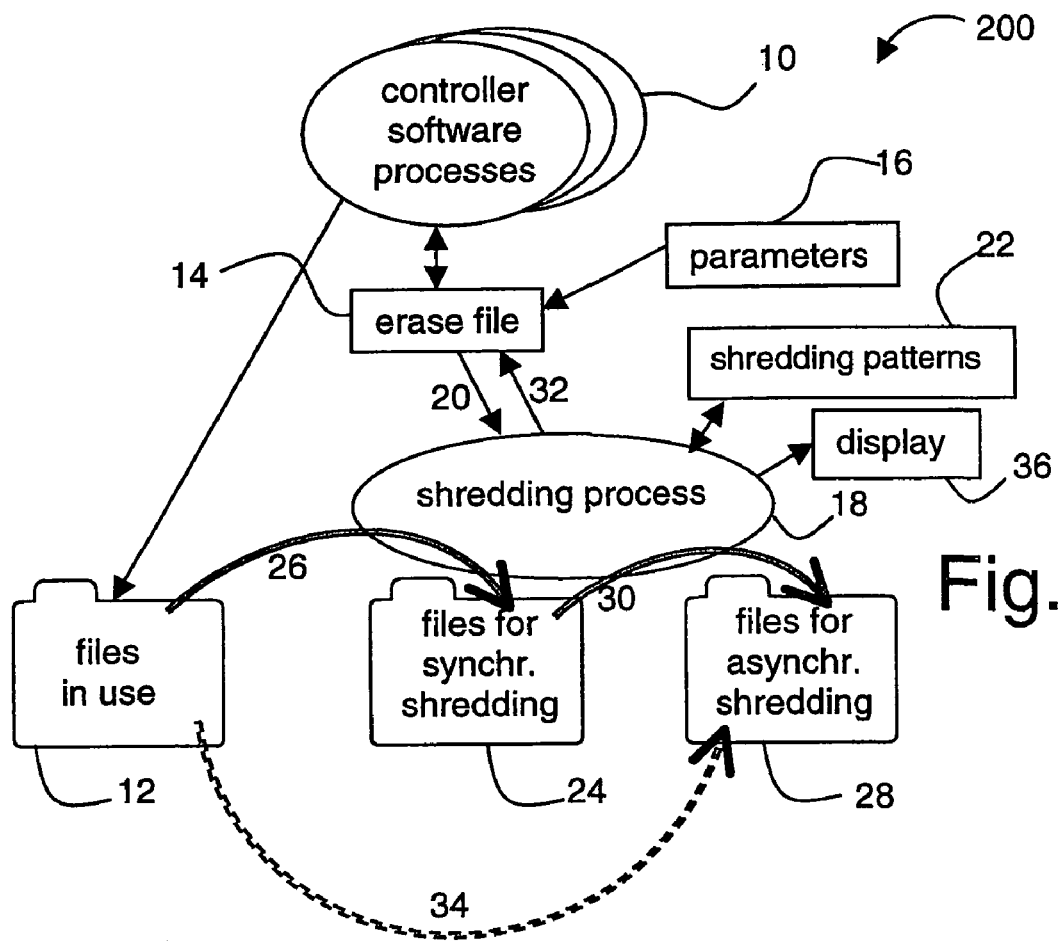
FIG. 1 is a system block diagram of a system according to the present invention.

FIG. 1 illustrates a system block diagram pertaining to the present invention. FIG. 1 is generally symbolically organized, so that various respective blocks will represent operations rather than identifiable hardware modules.

Referring to FIG. 1, elements 10 represent the relevant software processes of the controller of a device 200 in which the invention is practiced, such as a printer. The processes 10 make use of job-related files 12 stored in the internal disc of the device. In the course of the processes 10, some of the job-related files may no longer be needed, and in the context of the present invention, such files should be effectively erased. For that purpose, an erase file process is issued for such a file, as indicated by reference number 14. Erasure takes place in the form of over-writing the relevant data storage locations on the device disc, further to be called: shredding. During the shredding, the original data are over-written with various bit patterns, ranging from simple sequences of all zeroes to complex patterns of zeroes and ones.

The erase file process 14 is controlled by a set of user-defined or default parameters 16. Such parameters are for instance:

synchronous/asynchronous/combined shredding, and/or
number and selection of shredding patterns, and/or
shredding priority. The terms used here will be explained in the description below.

In reaction to the issuing of an erase file process 14, a shredding process 18 is activated (symbolized by arrow 20) for the specified file, and in accordance with the erasure parameters 16. Actual bit patterns for the shredding process are specified in a list 22, accessible for the process 18. All the components of the device in FIG. 1 are operatively coupled.

Before further describing the actual operation of the shredding process, we will now first explain several different shredding techniques as used herein, with reference to FIGS. 2, 3, 4 and 5. This example is directed to a printing application, but may, mutatis mutandis, also be applied to other document processing operations such as scanning and copying.

In printing, a print file is received via a network and stored in the system disc of the printing facility or printer. The print file may be encrypted in the case of secure data transport, or it may be encrypted directly after receipt. Print files wait in a print queue until they can be processed. When the printer is ready to process a print job, it reads the print file from the disc, if necessary decrypts it and processes the print file by rasterizing it, and subsequently prints the rasterized file. In a standard situation, the print file would thereupon be ready and need no longer be used at the printing facility.

FIG. 2 illustrates an example of an operation diagram without shredding being applied. As an example, print jobs are symbolized by sequences of three print sheets, but it will be clear that in fact print jobs may comprise any number of sheets. As shown, a first print job Job1 is processed first and is followed by a second print job Job2 and then a third job Job3.

FIG. 3 illustrates an operation diagram with so-called "synchronous" shredding as is known from the background art. For simplicity, the same configuration of jobs as in FIG. 2 has been assumed. But, in FIG. 3, at the end of executing Job1, the associated file is considered out-of-use. Thereupon, the shredding of Job1 is performed immediately. Subsequently, the execution of Job2 is performed. Of course, Job2 may become due for shredding as well. The requirement for shredding may be determined on the basis of an intended security level that can be non-uniform over the jobs. In an exemplary embodiment, only files protected by a PIN-code would be shredded (to be explained later). The information shredded can be the original information, and will preferably also include any intermediate or temporary data files created in the process, data rendered out-of-date through updating, such generally as considered appropriate vis-á-vis the intended security level. Generally, the actual operating system will know where to find such intermediates, even if the application in question is based on running third party software. Evidently, there may occur an unwanted delay in the processing of Job2, due to the preference given to the immediate or synchronous shredding of Job1.

By contrast, FIG. 4 illustrates an example of an operation diagram with so-called "asynchronous" shredding according to the present invention. As shown in FIG. 4, as soon as Job1 is finished and the associated files are up for shredding, the shredding of Job1 is actually started, provided that the execution of Job2 can proceed for some time interval without storage access. If such storage access becomes necessary, it can take preference over the shredding operation, as based on some preference criteria. This renders the shredding "asynchronous" regarding the decision "to-be-shredded". The shredding is triggered automatically on the basis of certain criteria. Subsequent to the interrupting, the shredding can proceed again. The procedure is executed likewise regarding the shredding of Job2 during execution of Job3. Thus, the shredding can occur in a time-distributed manner.

In a related and particularly advantageous embodiment of the present invention, shown in FIG. 5, the shredding occurs in a mixed manner (mixed shredding mode): for example, the first few (preferable only the first) shredding run(s) would be immediate, automatic and synchronous, i.e. before the next job is started. Further shredding runs would then be asynchronous. In this embodiment, the file can no longer be read by the system (although it would still be possible to reconstruct the stored data pattern using sophisticated analysis applied to the physical disc). Still, the most time-consuming part of shredding, the multiple overwriting, is done in the background and will not hinder the processing of the succeeding jobs.

Now, returning to FIG. 1, and in connection to the above-described mixed shredding mode, the shredding process 18 first removes the files-for-shredding from the file administration 12 by renaming them and moving the pointers to another storage location 24 (operation symbolized by arrow 26), that is dedicated to synchronous shredding. The data locations of the files are immediately overwritten with one or a limited number of shredding patterns.

After finishing the synchronous scanning operation, the shredding process 18 returns a "done" message to the erase file process 14 (symbolized by arrow 32), such that the erase file process 14 may signal the relevant primary process 10 that it may resume operation, and moves the pointers to the (shredded) files to a next storage location 28 (operation symbolized by arrow 30). The storage location 28 is dedicated to asynchronous shredding. The data locations of the files are now further overwritten in a background process, not further hampering the primary processes for the actual document data processing 10.

During the shredding process, status information of the process is communicated by the shredding process 18 to a display process 36 for informing an operator of the security situation of the system, as will further be explained with reference to FIG. 9.

As an alternative to the mixed mode shredding explained above, also fully asynchronous scanning may be effected for less important information. This mode can easily be done with the same composition of processes and structures as shown in FIG. 1, with the exception that files for shredding are removed directly to the storage location 28 dedicated to asynchronous shredding. This is symbolized by hatched arrow 34 in FIG. 1.

A particularly relevant application of the asynchronous shredding occurs with a shared printer facility, because such a printer may be shared among various different persons and groups. In such a case, security is all the more important. In particular, an advantageous organization of the present invention would be applied to printers using a mailbox concept as is featured by several printers and digital copiers, e.g. those marketed by Oce therein, all yet unprinted files reside in the mailbox and, moreover, printed files will remain there for some time until they are actively (or automatically, after a predetermined time interval of, say, 24 hours) removed. The mailbox is implemented as non-volatile memory, such as a hard disc. Therefore, if a user deletes a file from the mailbox, it is not only deleted from the file administration, but is also shred. Also in this case, it is advisable to execute the first shredding run in a synchronous manner, i.e. immediately after the delete command. Of course, for optimal security, all job files should be stored in encrypted form and only be decrypted when the data are needed for printing, while decrypted data are kept in volatile memory only.

Further, the invention can be applied in a digital copying and a scanning environment. Digital copying and digital scanning are notoriously data intensive. This raises the need for effective shredding.

Note that in a situation like FIG. 4 or 5, the effective shredding operation of Job1 may extend beyond the start of Job3, so that various jobs can be simultaneously performed in the course of being shredded. This will require determining some prioritizing among the various shredding runs, as will be discussed infra.

The above shredding procedure started from the level of the individual file or from bottom up. Another manner is to start on the system level: freeze the overall operations, and determine on the basis of file system operations whether deleted files should be shredded. This procedure will need an approach based on sector analysis. Usually, the operating system will sufficiently know the organization on the sector level.

Figure 6:
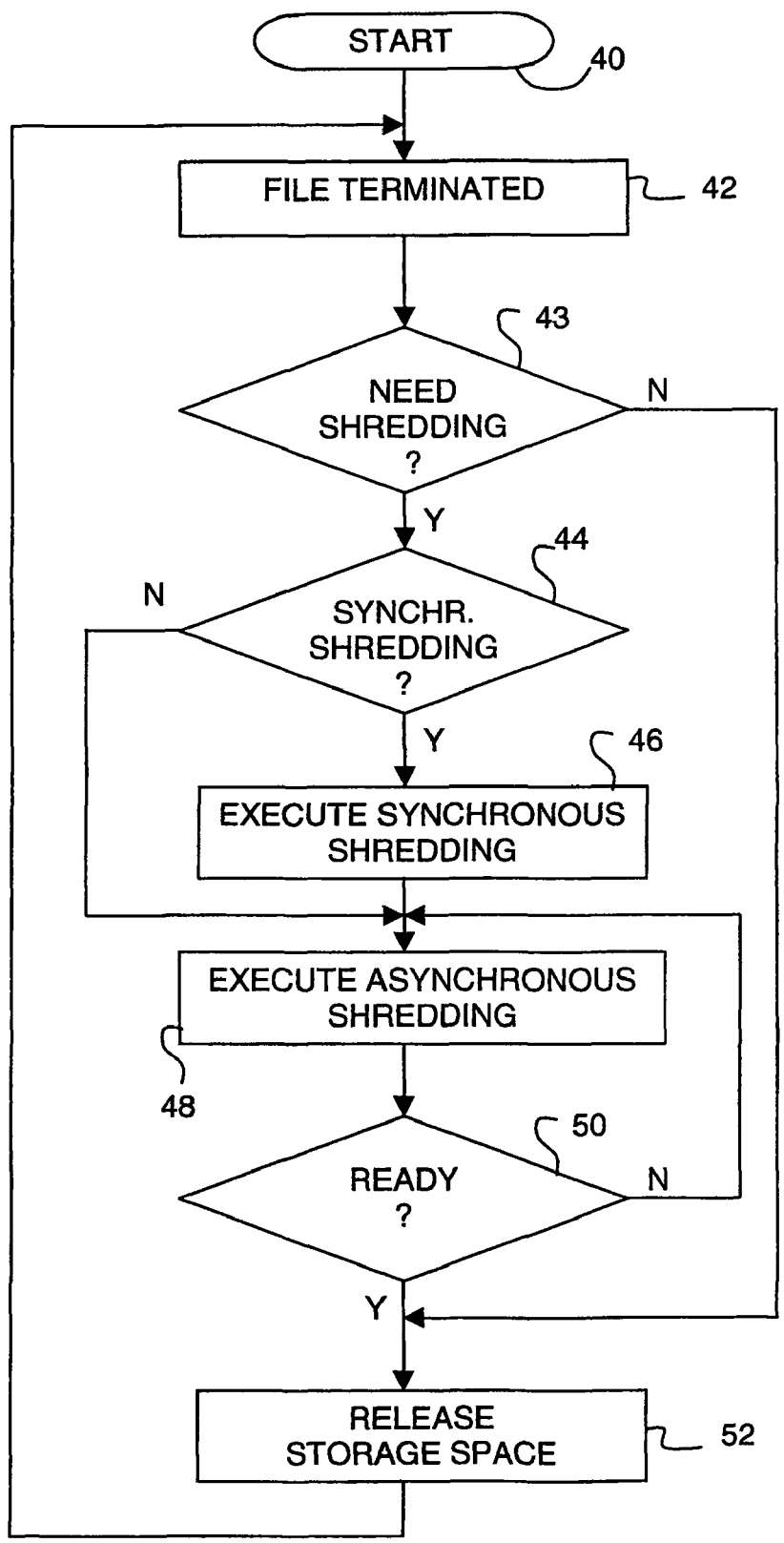
FIG. 6 is a flow diagram of a mixed (a)-synchronous shredding operation.

FIG. 6 illustrates a flow diagram of a mixed (a)-synchronous shredding operation according to an embodiment of the present invention. This operation can be implemented in the device of FIG. 1 or other suitable device(s)/system(s).

Referring to FIG. 6, in block 40, the operation starts, and the necessary hardware and software facilities get claimed. This operation will for example occur at power-up. In block 42, the system determines that a particular file or storage area is no longer needed. The organization of a pertinent waiting loop has not been shown. In block 43, the system determines whether shredding is necessary. If not, the system goes to block 52. If shredding is necessary, the system goes to block 44 to determine whether synchronous shredding is necessary. If synchronous shredding is not necessary (at block 44), the system goes to block 48. If synchronous shredding is necessary (at block 44), the system goes to block 46, for executing the synchronous shredding. Thereupon, in block 48, the asynchronous shredding is executed.

Starting of the asynchronous shredding is triggered when an interval occurs in between the normal data processing operations. Such interval can be detected through only the start thereof, or through finding that a particular interval is predicted to have at least a certain length. In this latter case, the shredding operation can on this lower level have a temporary precedence over the normal data processing. After a certain amount of shredding, the system may interrogate the standard data processing as to its storage access requirements. Such background processing is a basic mechanism of the particular operating system.

If shredding operations are in progress on more than one file, some priority organization is maintained. A first solution therefor is a first-come-first-take basis, so that the files are treated according to the sequence in which they were found shreddable, usually apart from the synchronous part of the shredding operation. A second approach is through letting the ranking number of the shredding pattern (cf. FIG. 7) determine the priority. Still another approach is through assigning a priority level to all asynchronous shredding operations that pertain to a particular file. In a printer application, print files would take preference over logging files.

Now, as long as the shredding must proceed, the loop of blocks 48 and 50 ("ready?") revolves. If shredding is ready, the system proceeds to block 52, wherein the storage area in question is released for new system usage. Thereupon, the system reverts to block 42.

For simplicity, the interaction between the shredding and the other data processing operations has not been given in detail, but various priority-controlled operations may be executed. Such details are considered well within the knowledge of the skilled person.

Furthermore, a brief delay could be introduced immediately after the finishing of a document data processing job, before a shredding process is allowed to start. Otherwise, if a new document data processing job starts, although it has priority over shredding processes, if a shredding process has claimed the disc, it takes some time for the priority job to access its required storage locations on the disc.

Shredding, and more in particular the further shredding runs after a synchronous initial shredding run, may also be performed off-line, e.g., just before shut-down of the system or at night or during quiet hours as a batch process. In fact, the storage sections used in print processing may in this case be used again after the initial shredding run, and only their use will be logged. Then, in the batch shredding at night, all files that have been logged as being used in the print processes during the day will be erased properly by shredding, leaving a "clean" system at the end.

The level of effectiveness of data shredding depends on the number and content of the shredding patterns used. Every additional shredding run makes retrieval of the original bit pattern on the storage medium more difficult, the more so when the shredding patterns used differ from run to run. It is therefore within the scope of the present invention to offer a settable security level to the users as discussed below.

In a first embodiment, as shown in FIG. 8a, the printer driver window 70 shown on the user's PC contains a security level setter in the form of a slide switch, a series of radio buttons or any other appropriate means. The printer driver window has a series of tabs, one (69) of which is here designated as "Erase Data", wherein a security level can be selected by clicking the appropriate button. Every security level relates to a predefined combination of shredding procedures and bit patterns as further explained below in relation to FIG. 7.

As an example, the list of options for the security level in FIG. 8a includes:

"Highest", in which the maximum number of shredding patterns (refer to FIG. 7) is used in a synchronous manner;

"High", in which an initial synchronous shredding run is followed by an asynchronous process using a selection of, e.g., 15 shredding patterns;

"Medium", in which only an asynchronous shredding process is applied, with a limited number of shredding patterns; and "Custom", in which a user may select his own choice of number and selections of shredding runs, including applying them as synchronous or asynchronous runs.

Of course, other options would be within the scope of the invention.

In the basic screen of the printer driver, shown in FIG. 8b, there is a tick box 71 for defining a particular print job as a security job. When a user does so, a forced dialogue will appear (not shown) for the user to enter a PIN code, that he will be asked for when it comes to printing the job. Other possible forms of security jobs involve other security tokens that are suitable for identifying or otherwise authorizing a user, such as a fingerprint, iris scan or code card. Defining a print job as a security job automatically enforces erasure by shredding of the print data in the printer after finishing the job.

In an alternative embodiment, the selection of the security level is reserved for a super user (also known as "key operator") or the system administrator, who may enforce a security level for all users, using a selection window similar to the one shown in FIG. 8a.

FIG. 7 illustrates a Table of shredding patterns as proposed by Gutmann in his article mentioned above in the Background Art section, which can be used in the present invention. The left column shows respective data passes or shredding runs. The second (right) column shows the various shredding patterns corresponding to the left column entries. Certain shredding patterns in the right column are random as generated by a random pattern generator. Others are produced by a sequence of more elementary patterns, produced by appropriately repeating bit patterns as shown in the right column in a hexadecimal "shorthand" notation ("0x" signalling hexadecimal notation). For example, the seventh row (Pass No. 7) would produce a repetition of the bit pattern 0x92, 0x49, 0x24, or "10010010 01001001 00100100". As shown, up to 35 shredding runs can be needed. An optimum case is attained through executing 35 successive runs with various different patterns as shown. To attain a balance between possible performance degradation and the needed security, the number of erasure patterns can be selected between 0 and 35. At 35 runs, the scheme is used as shown. When fewer runs are applied, a predetermined selection is made.

Figure 9:
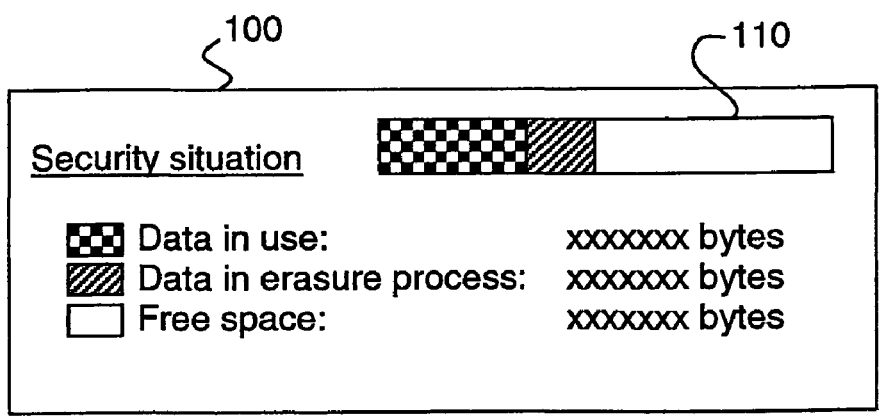
FIG. 9 is a user interface window for shredding process supervising.

FIG. 9 shows an information window 100 that can be projected on the local device display upon actuation of a key on the operating panel, e.g., of the printer, scanner, copier, or other document data processing device. It shows the actual security-related situation of the internal hard disc of the device, as entries for "Data in use" (excluding system files not related to document data), "Data in erasure process", and "Free" ("clean") disc space in bytes. A "fuel gauge" type display item 110 is added to give a quick impression of the situation. In an alternative embodiment, only entries for "Data in use" including data scheduled for shredding, but not yet completely erased, are shown. It would of course also be possible to show the information specified in numbers of files. With this indication on the device display, a user can instantly see if the data that should be removed are indeed gone. The necessary information to make the display can easily be delivered by the operating system resident in the device controller and can be refreshed regularly, to give a dynamic situation display. The display window can also be shown on the workstation of the system administrator.

The present invention may be used advantageously for scanning and copying in a very similar way. In scanning, on a dedicated scanner device or on a multifunctional device, a user must first enter his name or other identification code, and may then scan documents. The scan data are then stored on the system disc of the device in connection with the ID of the user. The user may then return to his workstation, contact the scanner and fetch his scan file. According to the present invention, the scan data are then removed from the disc and the used disc sectors are erased by shredding.

In a copy operation, a scanner scans the original document, stores the scan data on the internal disc of the copier, whereafter the printer prints the copies from the disc. Shredding of the used disc space may be done automatically or in reaction to a setting made by the operator while setting the copy job parameters.

In all cases mentioned, a shredding procedure effected wholly or at least partly as a background process according to the present invention, will only slightly disturb new print, copy or scan jobs.

Now, the present invention has hereabove been disclosed with reference to preferred embodiments thereof. Persons skilled in the art will recognize that numerous modifications and changes may be made thereto without exceeding the scope of the appended claims. In consequence, the embodiments should be considered as being illustrative, and no restriction should be construed from those embodiments, other than as have been recited in the claims.

The invention claimed is:

1. A method of erasing, in a document data processing device, a stored information pattern on a non-transitory rewritable data carrier that is accessible by a data processing facility of said device,
   the document data processing device having:
   a primary process related to said data processing facility, for processing document data, that accesses said data carrier for storing or reading document data on said data carrier, and
   a secondary process for erasing data stored by the primary process, through overwriting a selected storage area of said carrier by shredding patterns in a sequence of shredding runs,
   wherein at least part of said secondary process is run asynchronously, that is as a background process, such that primary processes are adapted to be started irrespective of the completion of any pending secondary processes,
   said method being characterized in that
   one or more initial shredding runs of the secondary process with respect to a storage area used in a first primary process is effected synchronously, that is by preventing starting of a next primary process following said first primary process until completion of said one or more initial shredding runs, and
   any remaining shredding runs are effected asynchronously.

2. A method as claimed in claim 1, wherein only one initial shredding run of the secondary process is adapted to be effected synchronously.

3. A method as claimed in claim 1, wherein the secondary process includes the following steps:
   determining shreddability of a selected storage area;
   a first detecting step for detecting a time interval between accessings by primary processes to said rewritable data carrier and thereupon activating said overwriting;
   a second detecting step for detecting either a completion of an overwriting process or an impending end of said interval and thereupon again granting access to a primary process;
   and, if necessary, looping back to said first detecting step.

4. A method as claimed in claim 1 or 2, wherein said overwriting is implemented on the basis of an intended security level with respect to said selected storage area.

5. A method as claimed in claim 1 or 2, wherein said overwriting is automatically effected for a security job, that is a print job that can only be printed after entering a security token, such as a password, at the printer location.

6. A method as claimed in claim 1 or 2, wherein said data processing device is a printer, a scanner or a combination thereof.

7. A method as claimed in claim 1 or 2, wherein said selected storage area includes storage of temporary, intermediate, and other data used by an actual operating system during a particular primary process.

8. A method as claimed in claim 1, wherein a storage area on said rewritable data carrier is automatically designated for said overwriting by a shredding pattern upon an out-of-use information being present with respect to said storage area.

9. A method as claimed in claim 1 or 2, wherein said overwriting is scheduled by respective priority levels among various deletable files, such priority level being controlled by the ranking of a particular shredding run among a plurality of shredding runs applicable to a particular file.

10. A method as claimed in claim 1 or 2, further including displaying overall progress of secondary processes in the device, to give an indication of an internal data security situation.

11. A document processing device comprising
a data processing facility and
a non-transitory rewritable data carrier accessible by said data processing facility,
said document processing device running
a primary process related to said data processing facility, for processing document data that accesses said data carrier for storing or reading data on said data carrier, and
a secondary process for erasing data stored on said data carrier by the primary process, through overwriting a selected storage area of said carrier by shredding patterns in a sequence of shredding runs,
wherein the device further includes
a scheduler for scheduling primary processes and any secondary processes in such a way that at least part of said secondary process is run asynchronously, that is as a background process, such that primary processes may be started irrespective of the completion of any pending secondary processes,
wherein
the scheduler is adapted to schedule any secondary processes in such a way that at least one initial shredding run is effected synchronously, that is by preventing starting of a next primary process until completion of said at least one initial shredding run, and further shredding runs are effected asynchronously.

12. A document processing device according to claim 11, wherein the scheduler is adapted to schedule any secondary processes in such a way that only one initial shredding run is effected synchronously.

13. A document processing device according to claim 11, further comprising
a shreddability determiner for determining shreddability of a selected storage area;
a time detector triggered by said shreddability determining means for detecting a time interval between accessings by primary processes to said rewritable data carrier and thereupon activating overwriting by said secondary process;
a completion detector for detecting either a completion of an overwriting process or an impending end of said interval and thereupon again granting access to a primary process;
and a recycler for looping back to said time detector.

14. A device as claimed in claim 11 or 12, including
a checker for checking a file of document data for presence of an information item indicating a security job, and wherein the data processing facility automatically applies a secondary process to a file having said added information item after having applied a primary process to said file.

15. A device as claimed in claim 11, including
a monitor for monitoring the overall progress of secondary processes in the device, and
a display for displaying said progress to an operator, to give an indication of an internal data security situation.

16. A device as claimed in claim 11, wherein said device is a printer, a copier or a scanner.

* * * * *